(12) United States Patent
Lange et al.

(10) Patent No.: US 12,438,406 B2
(45) Date of Patent: Oct. 7, 2025

(54) DRIVE DEVICE HAVING A BRUSHLESS ELECTRIC MOTOR

(71) Applicant: Brose Fahrzeugteile SE & Co. Kommanditgesellschaft, Bamberg, Bamberg (DE)

(72) Inventors: Gabriele Lange, Marktrodach (DE); Roland Kalb, Rossach (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 439 days.

(21) Appl. No.: 18/161,185

(22) Filed: Jan. 30, 2023

(65) Prior Publication Data

US 2023/0179035 A1 Jun. 8, 2023

Related U.S. Application Data

(63) Continuation of application No. PCT/EP2021/070906, filed on Jul. 26, 2021.

(30) Foreign Application Priority Data

Jul. 28, 2020 (DE) .................... 10 2020 209 500.0

(51) Int. Cl.
*H02K 1/16* (2006.01)
*H02K 3/32* (2006.01)
*H02K 7/116* (2006.01)

(52) U.S. Cl.
CPC .................. *H02K 1/16* (2013.01); *H02K 3/32* (2013.01); *H02K 7/116* (2013.01)

(58) Field of Classification Search
None
See application file for complete search history.

(56) References Cited

U.S. PATENT DOCUMENTS

| 4,574,460 A | * | 3/1986 | Bair ........................ H02B 3/00 |
| | | | 29/559 |
| 4,934,041 A | | 6/1990 | Hoover et al. |

(Continued)

FOREIGN PATENT DOCUMENTS

| CN | 201584827 U | * | 9/2010 |
| DE | 3123814 A1 | | 4/1982 |

(Continued)

*Primary Examiner* — Bernard Rojas
(74) *Attorney, Agent, or Firm* — Laurence A. Greenberg; Werner H. Stemer; Ralph E. Locher (57) ABSTRACT

A drive device has a transmission housing with an external rotor-type electric motor. The electric motor is coupled to the transmission and is actuated by a motor electronic unit. The electric motor has a stator and a rotor which circulates about the stator and is connected to a drive shaft that is guided through a stator bushing with a first sleeve section for holding the stator bushing in the transmission housing in a rotationally fixed manner and with a second sleeve section. A groove frame insulation which surrounds the stator teeth in the axial direction is placed on the second sleeve section. An annular element which is arranged between the first sleeve section and the groove frame insulation and which has a joint element is placed on the second sleeve section of the stator bushing. The joint element engages into a joint contour of the first sleeve section.

15 Claims, 10 Drawing Sheets

(56) References Cited

U.S. PATENT DOCUMENTS

| | | |
|---|---|---|
| 7,015,610 B2 | 3/2006 | Horng et al. |
| 10,003,224 B2 | 6/2018 | Jang et al. |
| 2014/0175912 A1 | 6/2014 | Germann et al. |
| 2015/0318762 A1 | 11/2015 | O |
| 2019/0284863 A1 | 9/2019 | Kalb |

FOREIGN PATENT DOCUMENTS

| | | |
|---|---|---|
| DE | 20221481 U1 | 1/2006 |
| DE | 102009059241 A1 | 6/2011 |
| WO | 2018046458 A1 | 3/2018 |

\* cited by examiner

DRIVE DEVICE HAVING A BRUSHLESS ELECTRIC MOTOR

CROSS-REFERENCE TO RELATED APPLICATION

This application is a continuation, under 35 U.S.C. § 120, of copending International Patent Application PCT/EP2021/070906, filed Jul. 26, 2021, which designated the United States; this application also claims the priority, under 35 U.S.C. § 119, of German Patent Application DE 10 2020 209 500.0, filed Jul. 28, 2020; the prior applications are herewith incorporated by reference in their entireties.

FIELD AND BACKGROUND OF THE INVENTION

The invention relates to a drive device, in particular an electric-motor adjustment drive, preferably a window lifter drive, of a motor vehicle, having a brushless electric motor in an external rotor embodiment.

With the foregoing and other objects in view there is provided, in accordance with the invention, a drive device containing a gearbox, motor electronics, a gearbox housing having a hollow-cylindrical housing portion, and a brushless electric motor in an external rotor embodiment assembled in the gearbox housing, and being able to be coupled or is coupled to the gearbox and being actuated by means of the motor electronics. The brushless electric motor has a stator bush and a stator with a slot cell insulation and a plurality of stator teeth disposed in a star-shaped manner and being wound with a stator winding. The brushless electric motor further has a drive shaft and a rotor revolving about the stator and connected to the drive shaft that is routed through the stator bush. The stator bush has a power take-off type first sleeve portion for mounting in a rotationally fixed manner the stator bush in the hollow-cylindrical housing portion of the gearbox housing and a second sleeve portion onto which the slot cell insulation that at least partially encompasses the stator teeth in an axial direction is disposed. An annular element, being disposed between the power take-off type first sleeve portion and the slot cell insulation, is disposed onto the second sleeve portion of the stator bush. The annular element has at least one joining element which engages in a corresponding joining contour of the power take-off type first sleeve portion of the stator bush.

A drive device, which, for example as an electric-motor adjustment drive of a motor vehicle, drives an actuating element between two terminal positions along an adjustment path, usually contains an electric motor and a gearbox which is coupled to the latter and is disposed in a drive housing or gearbox housing, respectively. The gearbox housing is usually connected to the motor housing by way of a flange-type connection, the electric motor typically being a brushed internal rotor commutator motor.

A drive device for a window lifter of a motor vehicle, in which a brushless electric motor embodied as an external rotor motor and motor electronics for actuating the latter are received in a drive housing or gearbox housing, is known from international patent disclosure WO 2018/046458 A1, corresponding to U.S. patent publication No. 2019/0284863. The electric motor has a stator and a rotor, configured as an external rotor, having a rotor shaft (drive shaft) which supports a worm, which is fixedly attached to the shaft, of a worm gear as a 90° angle gear. The worm gear is coupled to a cable drum which is wrapped by a plurality of windings or revolutions of a traction cable of a rail-guided entrainment element for a window glass. The stator has a stator main body having a number of stator teeth that are disposed in a star-shaped manner and wound with a rotating field winding. The stator main body sits on a bush-shaped bearing element which is fixedly connected to the gearbox housing and, in order to mount the rotor shaft or drive shaft, is penetrated by the latter which is rotatably fixedly connected to the rotor. The bearing element has a first shaft portion, which is cylindrically configured and protrudes into the stator main body, and a second cylindrical shaft portion which protrudes into the gearbox housing and is press-fitted to the latter, for example, in order to by way of the bearing element reliably hold the stator in position on the drive housing or gearbox housing.

SUMMARY OF THE INVENTION

The invention is based on the object of specifying a particularly suitable drive device of the type mentioned. In particular, the press-in forces for mounting the stator in the gearbox housing are to be as low as possible. Preferably, the stator is to be provided reliable protection in terms of position, in particular in terms of the radial and/or axial position thereof, in the gearbox housing.

This object is achieved according to the invention by the features of the independent claim. Advantageous refinements and design embodiments are the subject matter of the dependent claims.

The drive device according to the invention is in particular an electric-motor adjustment drive of a motor vehicle, preferably a window lifter drive, having a brushless electric motor in an external rotor embodiment. The latter is disposed in a drive housing, hereunder also referred to as a gearbox housing, and is coupled to a gearbox, in particular in the form of a worm gear. Moreover, motor electronics for actuating the electric motor are disposed in the gearbox housing.

The electric motor has a stator having a number of stator teeth which are disposed in a star-shaped manner and are wound with the stator winding. The stator suitably contains a stator main body which is preferably embodied as a laminated core having a central through opening. The electric motor moreover has a rotor which revolves about the stator and suitably has a number of permanent magnets in a pot-type rotor housing, in particular effective as a magnetic back iron, and is connected to a drive shaft. The stator having the stator winding is disposed within the rotor. The drive shaft is routed through a stator bush which serves in-particular as a stator carrier for the wound stator main body. The stator bush has a first bush or sleeve portion for mounting the stator bush in a rotationally fixed or rotationally locked manner, respectively, in the gearbox housing, and a second bush or sleeve portion onto which a slot cell insulation is placed.

An annular element is placed onto the second sleeve portion of the stator bush, said annular element being disposed between the first sleeve portion and the slot cell insulation and having at least one joining element, in-particular two joining elements disposed so as to be offset by 180°. The respective joining element engages in a corresponding joining contour, in-particular in the form of an axial groove, of the first sleeve portion of the stator bush.

The first sleeve portion of the stator bush is of a power take-off type and suitably has a serration for preferably only form-fitting connection in the manner of a spline toothing, or else also for connecting the stator bush, which supports the stator, in a form-fitting and force-fitting manner to the gearbox housing. To this end, the latter has a hollow-cylindrical housing portion in which the first sleeve portion of the stator bush is inserted, preferably without any press-in force, or only by way of an ideally minor press-in force.

A "form-fit" or a "form-fitting connection" between at least two parts connected to one another is presently and hereunder understood to mean in particular that the cohesion of the parts connected to one another at least in one direction takes place by a direct mutual engagement of contours of the parts per se, or by way of an indirect mutual engagement via an additional connecting part. The "blocking" of any mutual movement in this direction is thus performed as a consequence of the shape.

A "force-fit" or a "force-fitting connection" between at least two parts connected to one another is presently and hereunder understood to mean in particular that the parts connected to one another are prevented from sliding on one another by virtue of a frictional force acting therebetween. In the absence of a "connecting force" which causes this frictional force (i.e. the force which pushes the parts against one another, for example a screw force or the force of the weight per se), the force-fitting connection thus cannot be maintained and thus be released.

If the connection between the stator bush, which supports the stator or the main body of the latter, respectively, and the gearbox housing is form-fitting and force-fitting, this connection is thus established by way of an ideally minor deformation of the housing material in the region of the hollow-cylindrical gearbox housing portion. As a result, as in the form-fitting connection between the stator bush and the gearbox housing, the press-in force is ideally minor or is largely reduced.

The slot cell insulation is expediently formed from two molded plastic parts which have an annular portion and integrally molded thereon semi-shell-shaped coil carriers which extend radially (in a star-shaped manner) and the number of the latter corresponding to that of the stator teeth. These two slot cell insulation parts are placed onto its stator main body at the two end sides of the stator such that the semi-shell-shaped coil carriers axially (in the axial direction) at least partially span or encompass the stator teeth, and correspondingly, in the manner of a box, at least partially clad the stator grooves between the stator teeth. The rotating field winding is applied to this slot cell insulation such that the former is electrically isolated in relation to the stator main body.

The slot cell insulation parts here can preferably be identical such that the production by means of a simple mold is made possible and is particularly minor in terms of complexity. In this variant, the annular element is provided as a separate part, preferably likewise as an injection-molded plastics part. In this instance, the annular element on the end side that faces away from the joining element and faces the slot cell insulation suitably has a positioning and/or rotational locking element which, preferably in a form-fitting manner, engages in a joining groove (axial groove) of the slot cell insulation. Alternatively, the annular element can be integrally molded on one of the slot cell insulation parts, this in turn simplifying the positioning and mounting of the annular element on the slot cell insulation.

The respective joining element of the annular element in an advantageous design embodiment extends axially, thus in the axial direction in terms of the motor or shaft axis of the electric motor. The joining contour of the stator bush, which corresponds to the respective joining element, suitably likewise extends axially and into the power take-off type first sleeve or bush portion of the stator bush. In particular, the joining contour in the axial direction completely penetrates the first sleeve or bush portion of the stator bush.

In an advantageous refinement of the respective joining element, the latter on the free end has a hook or clip element which engages in a corresponding latching opening of the hollow-cylindrical housing part or portion of the gearbox housing. Additionally or alternatively provided in the joining contour of the first sleeve portion of the stator bush is a radially raised latching contour which in a pre-assembled state of the annular element on the stator bush, in a first latching or clip-fitting connection, and in particular also in the joining state of the stator bush in the hollow-cylindrical housing part of the gearbox housing is engaged from behind by the joining element on the annular element, in particular by the preferably wedge-shaped hook or clip element of the latter on the free end.

A second latching or clip-fitting connection is preferably established in this terminal position of the stator in the gearbox housing. In order to achieve simple and reliable assembling of the stator in the process, the radially raised latching contour suitably has an oblique bearing contour for the joining element on the annular element, in particular for the preferably wedge-shaped hook or clip element on the free end thereof. Additionally or alternatively, the hollow-cylindrical housing part of the gearbox housing in the region of an insertion opening or plug-in opening for the stator bush having the annular element held thereon in the first latching or clip-fitting connection has an introduction ramp for the joining element on the annular element, in particular for the preferably wedge-shaped hook or clip element on the free end thereof. As a result, the assembly composed of the stator bush and the stator main body, and the annular element and the slot cell insulation, having the already established first latching or clip-fitting connection, can be inserted into the gearbox housing, wherein the respective joining element on the annular element suitably yields in a radially inward manner and in the terminal position, while establishing the second latching or clip-fitting connection, rebounds radially.

In an expedient design embodiment, the annular element has a guide rim having a number of axially running receptacle grooves and/or a number of receptacle grooves which at an angle run obliquely in relation to the central axis for receiving winding portions, stator winding ends, coil or phase connectors. The angle of obliqueness or inclination is between 20° and 70°, in-particular between 30° and 60°, preferably between 40° and 50°, particularly preferably between 45° and 50°. In this embodiment, the annular element assumes a dual function, specifically the (radial, axial) positioning of the stator, and the guiding of the stator winding ends thereof, or coil or phase connectors, respectively.

The advantages achieved by the invention lie in particular in that, as a result of the annular element being provided as a separate part or as a molded part of the slot cell insulation of the stator, the mounting or positioning of the latter in the gearbox housing is reliably ensured while avoiding or at least significantly reducing press-in forces.

Reliable position protection of the stator in terms of the axial and the radial position of the latter within the gearbox housing here is advantageously achieved by the form-fitting connection, or form-fitting and force-fitting connection, between the stator bush, which serves as a stator carrier as well as a shaft mounting or shaft guide of the drive shaft or rotor shaft, respectively, and the gearbox housing, on the one hand, and the form-fitting or materially integral connection between the annular element and the slot cell insulation of the stator, or the stator main body of the latter, respectively.

The advantageously additional clip-fitting or latching of the annular element to the stator bush (first latching or clip-fitting connection), on the one hand, and that to the gearbox housing (second latching or clip-fitting connection), on the other hand, provide in a simple and reliable manner a particularly high level of protection in relation to twisting and any unintentional longitudinal displacement of the stator.

Other features which are considered as characteristic for the invention are set forth in the appended claims.

Although the invention is illustrated and described herein as embodied in a drive device having a brushless electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually equivalent parts are provided with the same reference signs in all figures.

Figure 1:
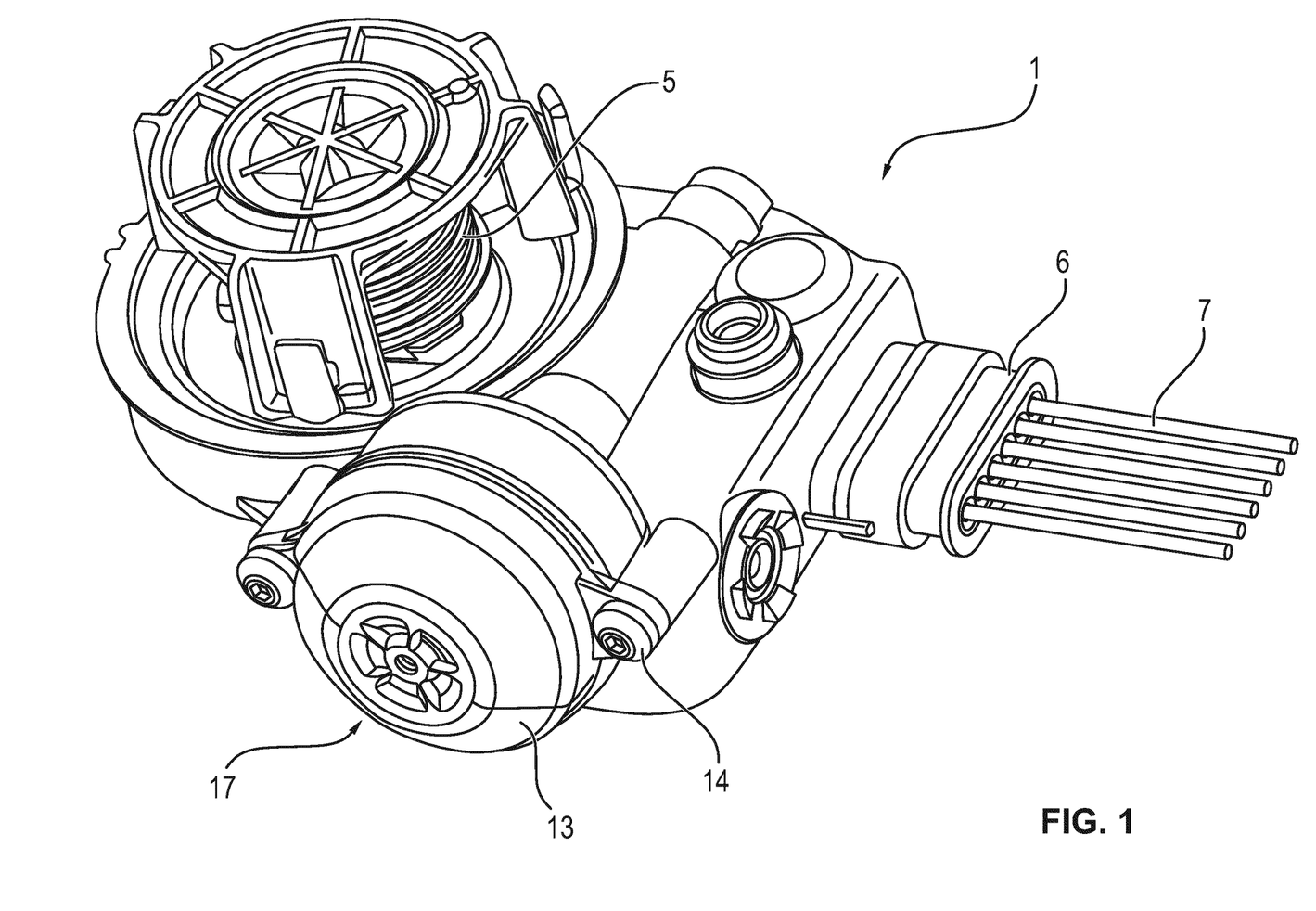
FIG. 1 is a diagrammatic, perspective illustration showing a drive device having a gearbox housing (drive housing) and received therein an electric motor for driving a cable drum as a drive output element of a window lifter of a motor vehicle.
Figure 2:
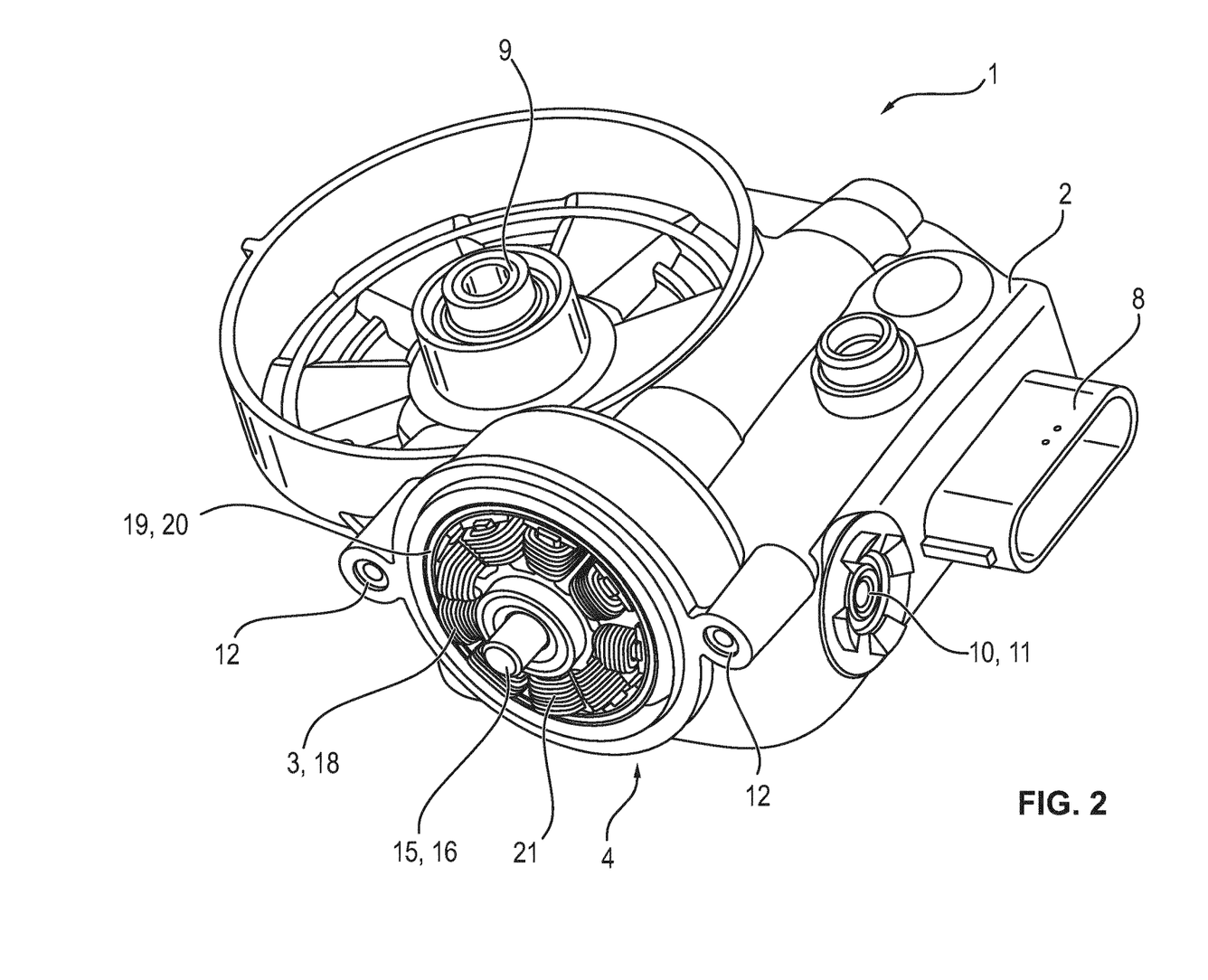
FIG. 2 is a perspective illustration according to FIG. 1 showing the drive device with a view onto the inserted electric motor, with a removed (motor) gearbox cover and without a cable drum and without a rotor.

Referring now to the figures of the drawings in detail and first, particularly to FIG. 1 and thereof, there is shown in a perspective illustration an electric-motor drive device 1 having a gearbox or drive housing 2 in which an electric motor 3 in an external rotor embodiment is inserted. To this end, the gearbox housing 2 has a housing opening (insertion opening) 4 by way of which the electric motor 3 is able to be introduced into the gearbox housing 2, or is inserted in the latter, respectively. The electric motor 3, by way of a gearbox (not visible), drives a drive output element 5 which in the exemplary embodiment is a cable drum for a traction cable of a window lifter of a motor vehicle. A plug connector 6 having connecting lines 7 for supplying the drive device 1, which serves as an adjustment drive of the motor vehicle, with a current and voltage, and for feeding and/or discharging control or sensor signals, is plugged into a connector receptacle 8 on the housing.

The gearbox of the drive device 1 is a 90° angle gear, in particular a worm gear, of which the worm gear wheel drives the drive output element 5 by way of a drive or shaft journal 9. A ventilation opening 10 on the housing is covered by a diaphragm 11 impermeable to gas and/or liquid. Two connector domes 12 for fastening (screw fastening) a housing cover 13 are disposed on either side of the housing opening 4. To this end, the housing cover 13, by means of screws 14 received in the connector domes 12, is fastened to the drive housing 2, and on the latter in the region of the housing opening 4. A shaft journal 15 of a drive shaft (rotor or motor shaft) 16 is also mounted on a bearing point 17 in the housing cover 13, for example, or only sits there.

Figure 3:
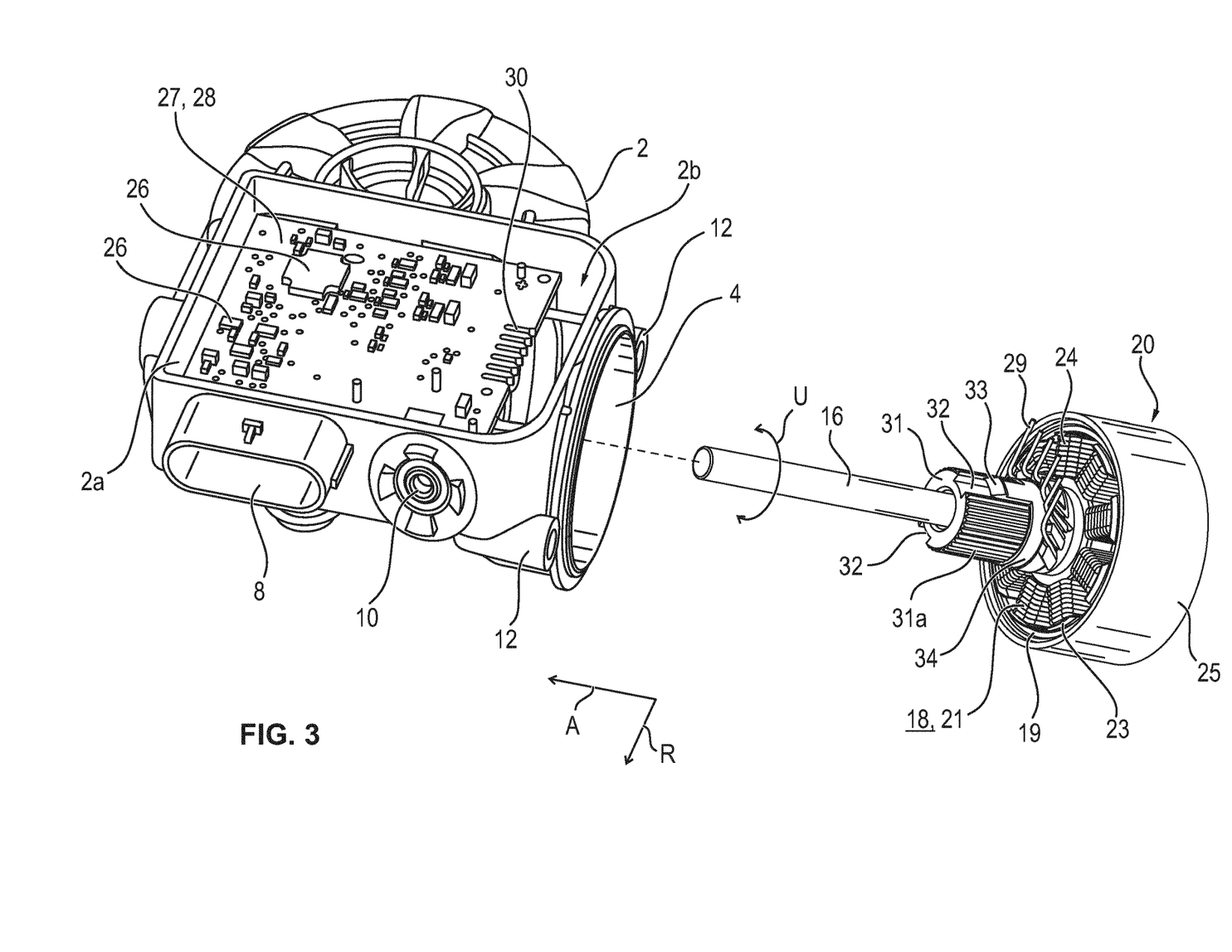
FIG. 3 is an exploded, perspective illustration showing the drive device having the electric motor in a pre-assembled position, prior to being inserted into the drive housing, with a view into the gearbox housing on the housing side opposite that of FIG. 1, with a removed (electronics) housing cover.

Also with a view to FIG. 3, the electric motor 3 has a stator 18 and a rotor 20 which is formed from permanent magnets 19. The stator 18 carries a stator or rotating field winding 21 which hereunder is referred to simply as a winding. The winding 21 is applied to a slot cell insulation 23 which encloses a stator main body 18a which is partially visible in FIG. 12 and has stator teeth 24 disposed in a star-shaped manner. In the exemplary embodiment the stator 18 has nine (9) stator teeth 24 of which only one stator tooth 24 is referenced in FIG. 3.

The permanent magnets 19 of the rotor 20 are disposed on the inside wall in a pot-type housing (rotor housing) 25. The housing 25, for example by way of a shaft journal, is connected in a rotationally fixed manner to the drive shaft 16 and within the housing 2, or the housing cover 13, respectively, thus rotates about the stator 18 of the brushless electric motor 3 embodied as an external rotor motor, the stator being stationary in the gearbox housing 2. The rotor shaft 16 supports a worm which is not illustrated and in the assembled state meshes with a worm gear wheel (not visible) of the gearbox. A magnetic encoder (pulse wheel) which for determining or ascertaining the rotating speed and the rotating direction of the drive shaft 16 interacts in a non-contacting manner with a magnetic sensor, for example with a Hall sensor, may sit on the rotor shaft 16.

A circuit board 27 of motor electronics 28 is located within the drive housing 2, the circuit board 27 being populated with electronic and/or electric construction elements 26. The interior space 2b of the gearbox housing 2 is accessible by way of a housing opening 2a which by means of a housing cover (not illustrated) is closed once the assembly of the gearbox and the motor electronics 28 including the circuit board 27 has been completed. Once the assembly of the circuit board 27 has been completed, the electric motor 3 is pushed, introduced or inserted into the gearbox housing 2 by way of the housing opening 4. In terms of the plotted axial direction A and radial direction R, the circuit board 27 is assembled so as to be radially spaced apart from the drive shaft (motor shaft) 16 in the drive housing 2.

In the course of the electric motor 3 being introduced into the gearbox housing 2, a plug-in connection or joining connection of phase or coil connectors 29 of the winding (rotating field or stator winding) 21 of the electric motor 3 with connection receptacles 30 of the circuit board 27 within the gearbox housing 2 takes place. To this end, the coil or phase connectors 29 are brought to a radially oriented joining position.

Figure 4:
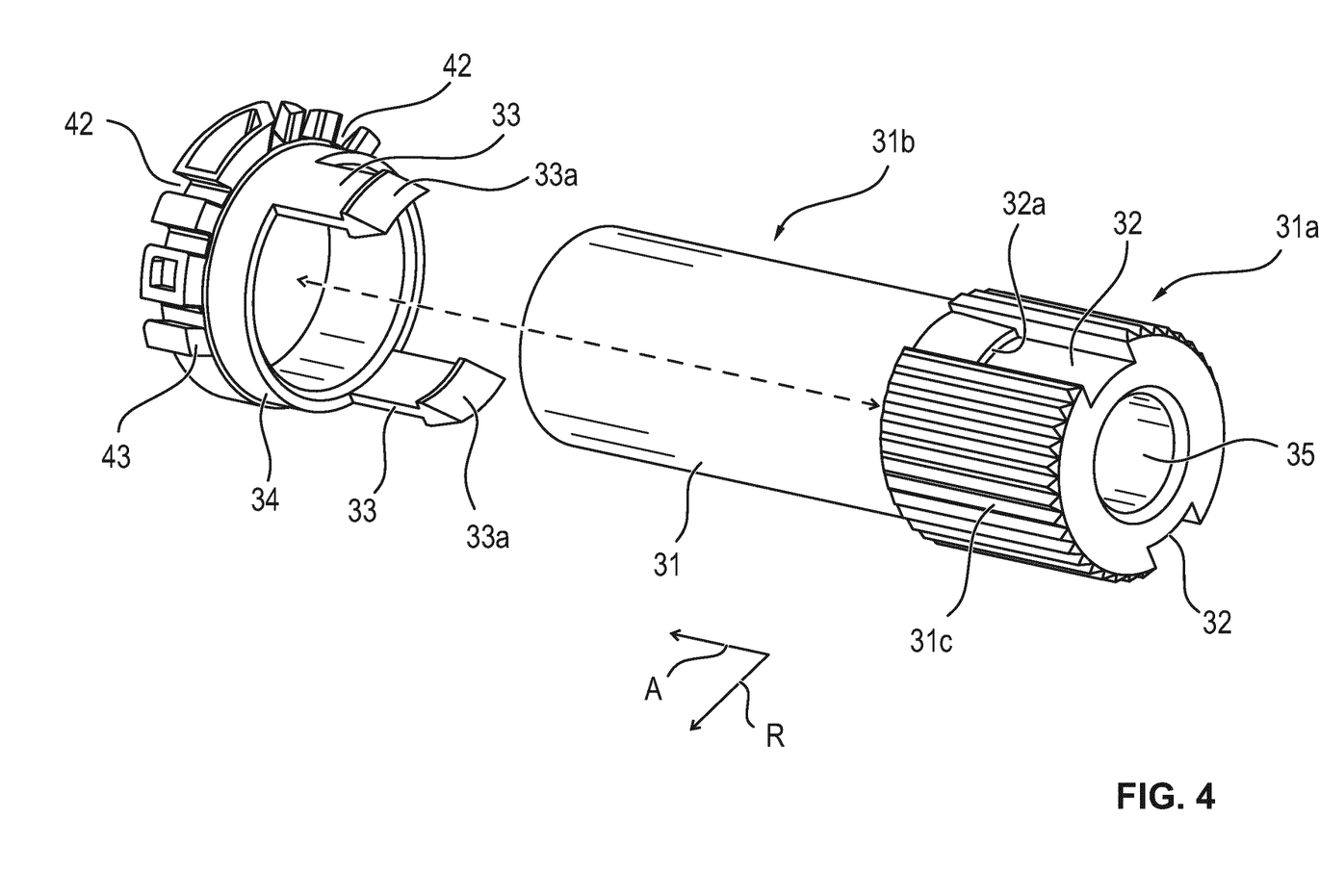
FIG. 4 in an exploded illustration shows a stator bush which serves as a carrier (stator carrier) of a stator main body, having a power take-off type sleeve portion having axial grooves as joining contours, and an annular element having two joining elements embodied having latching or clip-fit hooks.
Figure 5:
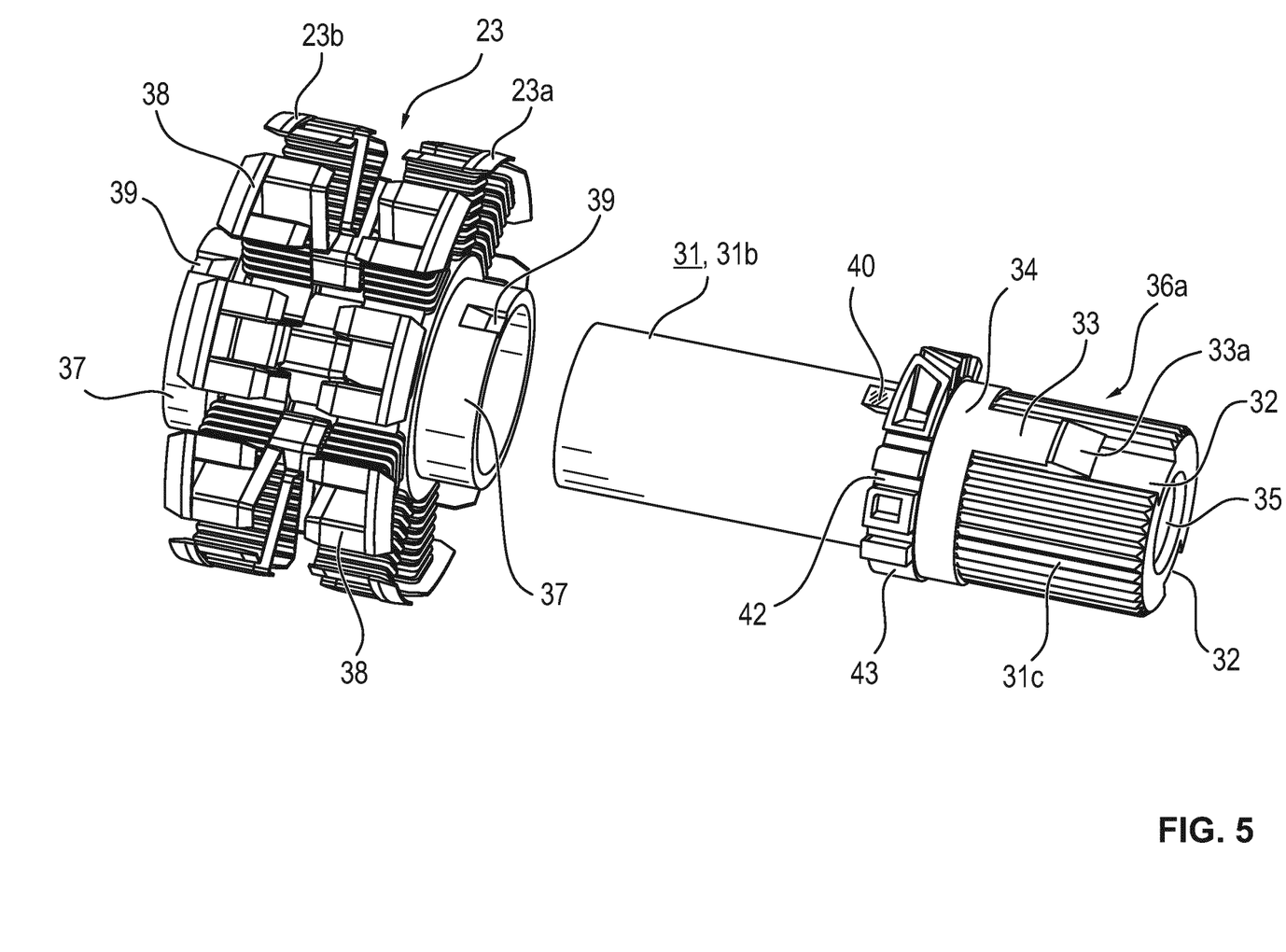
FIG. 5 is an exploded, perspective illustration showing the stator bush having a placed annular element and a slot cell insulation having two same (identical) slot cell insulation parts for the stator or rotating field winding of the stator, or of the stator main body of the latter, respectively.
Figure 6:
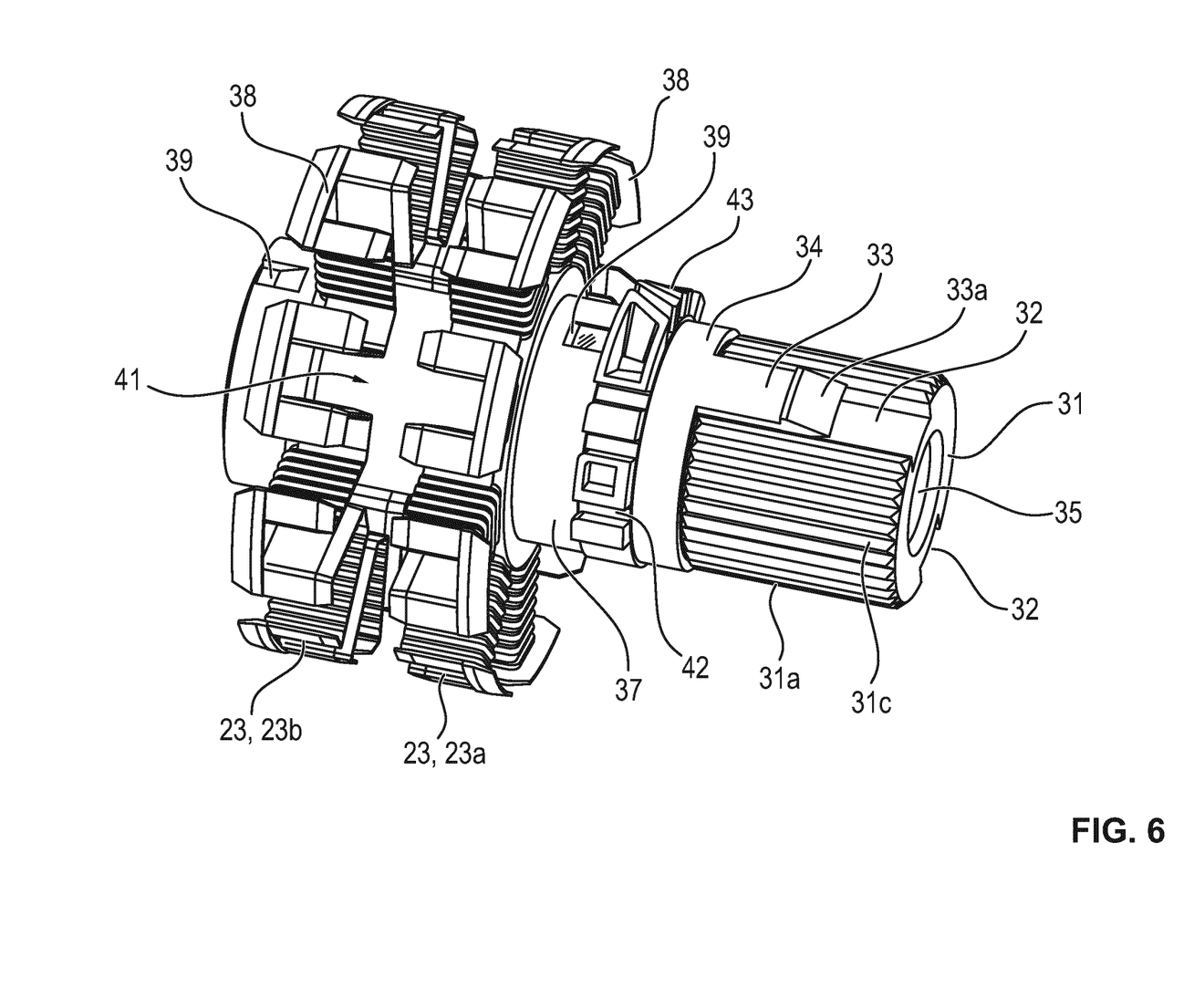
FIG. 6 is a perspective illustration showing the assembly shown in FIG. 5, composed of stator bush, annular element and two-part slot cell insulation (two-part variant composed of a slot cell insulation part and an annular element)

As is explained in more detail hereunder by means of FIGS. 4 to 6, the stator 18 having the stator main body 18a thereof enclosed by the slot cell insulation 23 and the applied winding 21 is held in the intended position on a stator bush or stator sleeve 31 serving as a carrier (stator carrier). A safeguard in terms of rotational blocking in relation to twisting in the circumferential direction U and a safeguard in terms of axial displacement in an axial direction A has already been established here. To this end, the stator bush 31 in a first sleeve or bush portion 31a has an axial groove as a (corresponding) joining contour 32, a joining element 33 of an annual element 34 sitting therein. The joining element 33 is moreover configured for guiding the coil or phase connectors 29 to the radial joining position of the latter.

Figure 9:
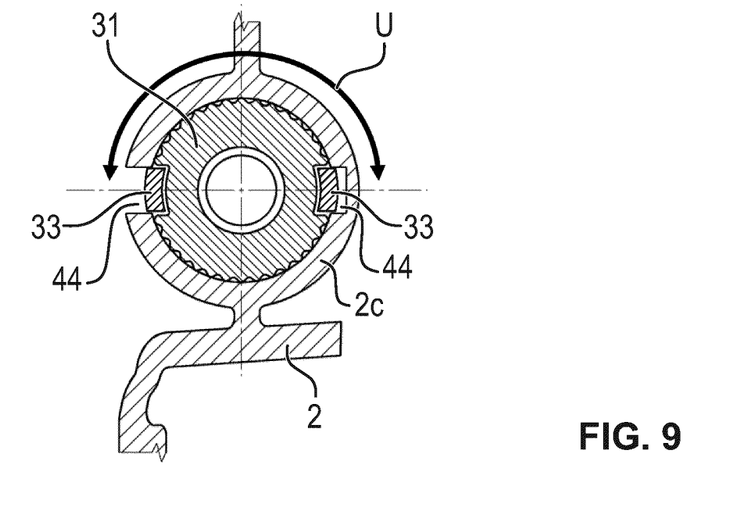
FIG. 9 is a sectional illustration taken along the line IX-IX shown in FIG. 8 showing a latching mechanism (clip-fit mechanism) of the annular element with relaxed latching or clip-fit hooks of the joining elements of the annular element.
Figure 10:
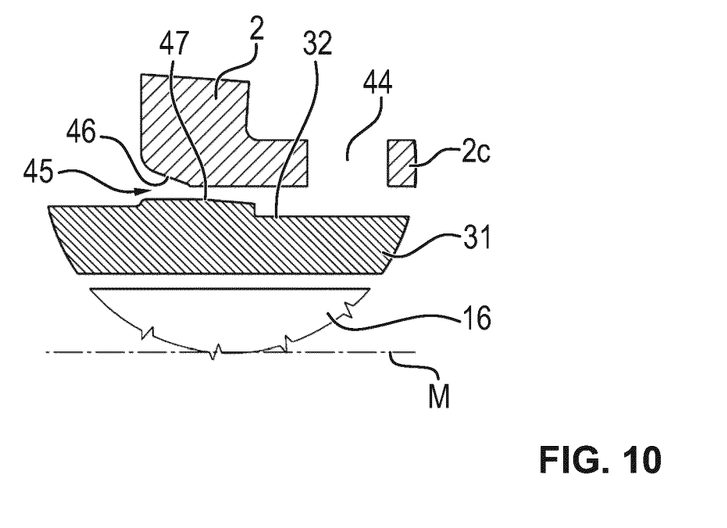
FIG. 10 is a sectional illustration showing a region of an insertion opening in the gearbox housing, having an introduction ramp and having an extraction ramp on a radially raised latching contour in the joining contour (joining groove, axial groove) of the stator bush as an oblique bearing contour for the respective joining element of the annular element.
Figure 11:
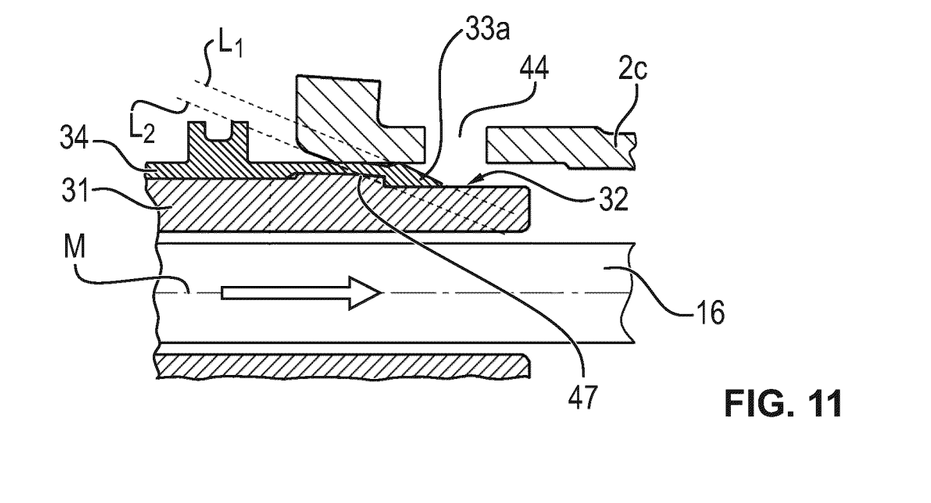
FIG. 11 is a sectional illustration according to FIG. 10 showing the assembly having one of the joining elements of the annular element in a position during the introduction or insertion procedure of the stator into the gearbox housing.
Figure 12:
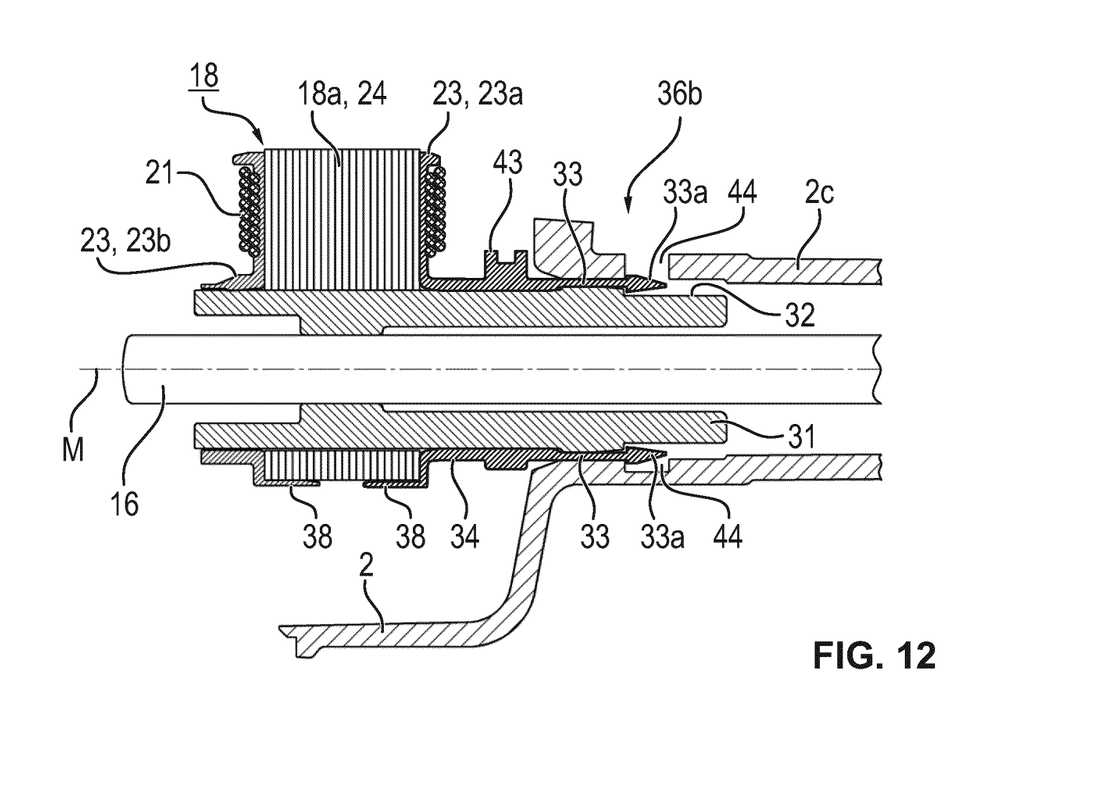
FIG. 12 is a sectional illustration taken along the line XII-XII shown in FIG. 8 showing the assembly having the stator (of the assembly) in the final assembly position.

FIG. 4 shows the stator bush 31, which serves as a carrier (stator carrier) of the stator main body 18a, having the power take-off type (first) sleeve portion 31a, having axial grooves as joining contours 32, and the annular element 34 having two joining elements 33 embodied as latching or clip-fit hooks, in a pre-assembly position. The power take-off type first sleeve portion 31a on the external circumference is provided with a serration 31c. With the electric motor 3 inserted into the gearbox housing 2, by way of the serration 31c the tight fit of the latter in a hollow-cylindrical housing portion 2c (FIGS. 9 and 12) is established by means of a form-fitting or form-fitting and force-fitting connection between the stator bush 32 and the gearbox housing 2. The axial groove as a (corresponding) joining contour 32, which is provided in the first sleeve or bush portion 31a of the stator bush 31, advantageously has a radially raised latching contour 32a (FIGS. 10 to 12). Instead of the serration 31c, a one-sided or two-sided flat area can also be provided on the sleeve portion 31a.

In the final assembled state of the electric motor 3 in the gearbox housing 2, also shown in FIG. 12, the drive shaft 16 which is connected in a rotationally fixed manner to the rotor 20 is guided by way of the stator bush 31 and for this purpose by way of the central bearing opening 35 thereof.

In the assembled state of the annular element 34 on the stator bush 31 shown in FIG. 5, when the annular element 34, in a manner corresponding to the dashed-line double arrow not referenced in more detail, has been pushed along a second sleeve or bush portion 31b of the stator bush 31 onto the latter, the joining element 33 on the annular element, by way of a wedge-shaped hook or clip element 33a provided on a free end, engages behind the radially raised latching contour 32a on the stator bush, while establishing a first latching or clip-fitting connection 36a. As a result, the annular element 34 in the intended position thereof on the stator bush 31 is secured (radially, axially) in relation to twisting and in relation to a longitudinal displacement.

As can also be seen in conjunction with FIG. 6, the stator bush 31 also serves as a carrier (stator carrier) of the slot cell insulation 23. The slot cell insulation 23 has an annular portion 37 which in the region of the second sleeve portion 31b of the stator bush 31 encompasses the latter and on which a number of semi-shell-shaped, radially extending coil carriers 38 are integrally molded, the number of the latter corresponding to the number of the stator teeth 24. The coil carriers 38 span or encompass the stator teeth 24 at least in regions in the axial direction A, and in the manner of a box clad the stator grooves, not referenced in more detail, formed between the stator teeth 24.

The slot cell insulation 23 in the embodiment shown in FIGS. 5 and 6 (two-part variant composed of slot cell insulation part 23 and annular element 34) has two same, preferably identical, slot cell insulation parts 23a, 23b. The latter in turn, in the annular portion 37, have a joining or axial groove 39. A hook or journal-shaped positioning and/or rotational blocking element 40, which is provided on the end side of the annular element 34 that faces the slot cell insulation 23, engages (in a form-fitting manner) in said joining or axial groove 39. As a result, the corresponding slot cell insulation part 23a by means of the annular element 34 is secured in relation to twisting on the stator bush 31 and is disposed (mounted) in the intended position. Because the stator main body 18a of the stator 18 is received between the slot cell insulation parts 23a, 23b, and in the process the stator teeth 24 not illustrated here are received in the tooth spaces 41 formed by the coil carriers 38, and the latter are provided with the winding 21, the stator 18 having the assembly composed of the slot cell insulation 23, the stator main body 18a and the winding 21 is overall held on the stator bush so as to be secured against twisting and securely positioned so as to be axially secured in an axial direction A.

The slot cell insulation 23 and herein the coil carrier 38 thereof in particular serve for electrically isolating the coils which, with the intervening tier of the slot insulation 23, are wound on the stator teeth 24 and by means of the motor electronics are or have been electrically connected to one another in a star circuit or a delta connection so as to form the rotating field or stator winding 21. The slot cell insulation parts 23a, 23b, which in this variant with a view to simple and cost-effective manufacturing (production) are advantageously identical, are placed onto the stator bush 31 so as to be mutually twisted, or mirror-inverted (inversely congruent), as can be clearly seen in FIG. 6.

Figure 7:
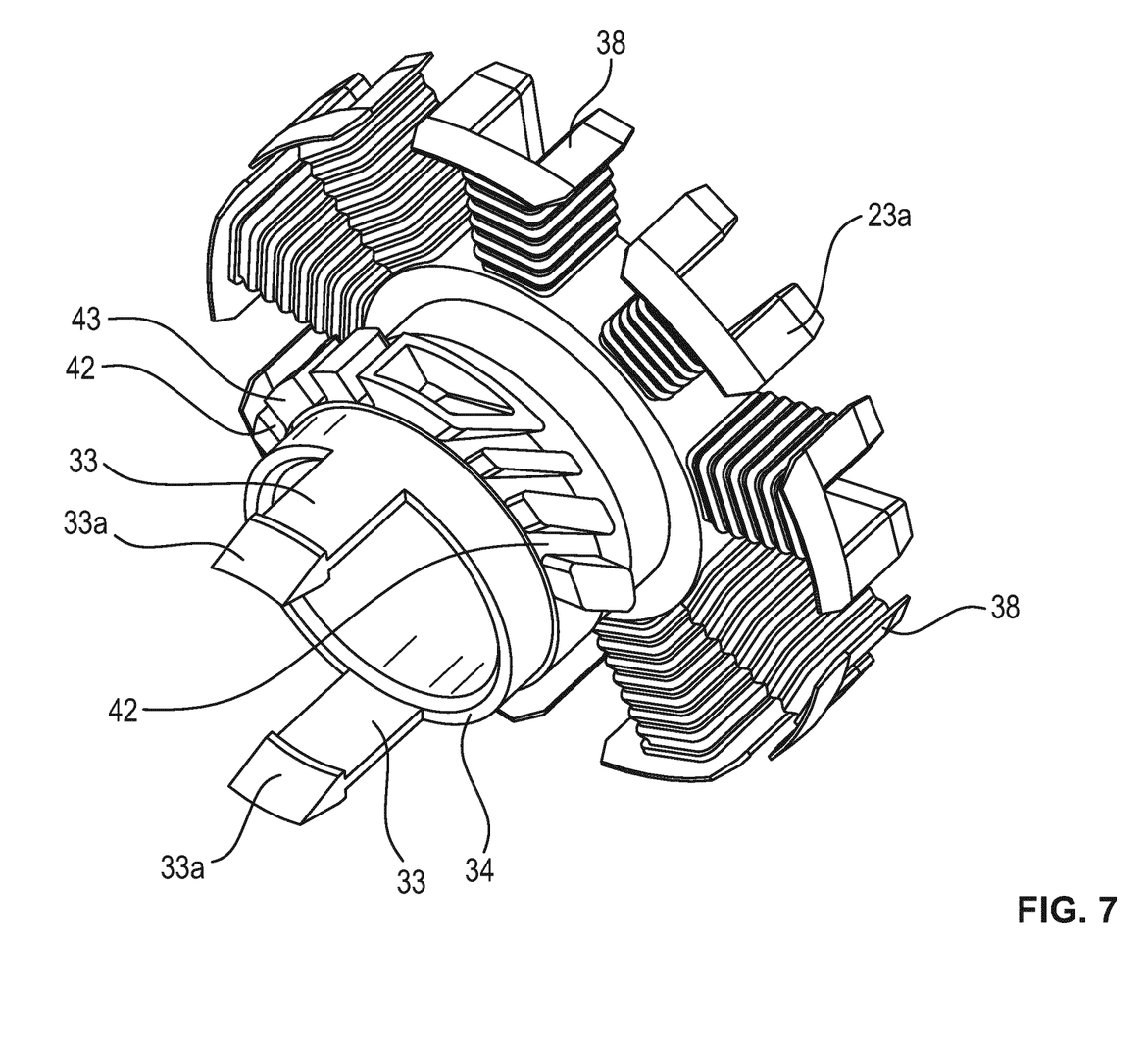
FIG. 7 is a perspective illustration showing a variant having an annular element molded onto a slot cell insulation part (one-part variant composed of slot cell insulation part and annular element)

FIG. 7 in a perspective illustration shows a variant having an annular element 34 integrally molded on one of the slot cell insulation parts 23a, 23b (one-part variant composed of slot cell insulation part 23a and annular element 34). The assembly composed of the slot cell insulation part 23a and the annular element 34 here can be embodied as a bi-component plastics part. This is advantageous with a view to hot caulking of the phase or coil connectors 29 that lie in clearances or grooves 42 of the annular element 34. The clearances or grooves 42, of which some are axially oriented and some are oriented so as to run obliquely at an angle of preferably (45±5°) are incorporated in a guide rim 43 which is integral to the annular element 34 (in one part with the latter).

Figure 8:
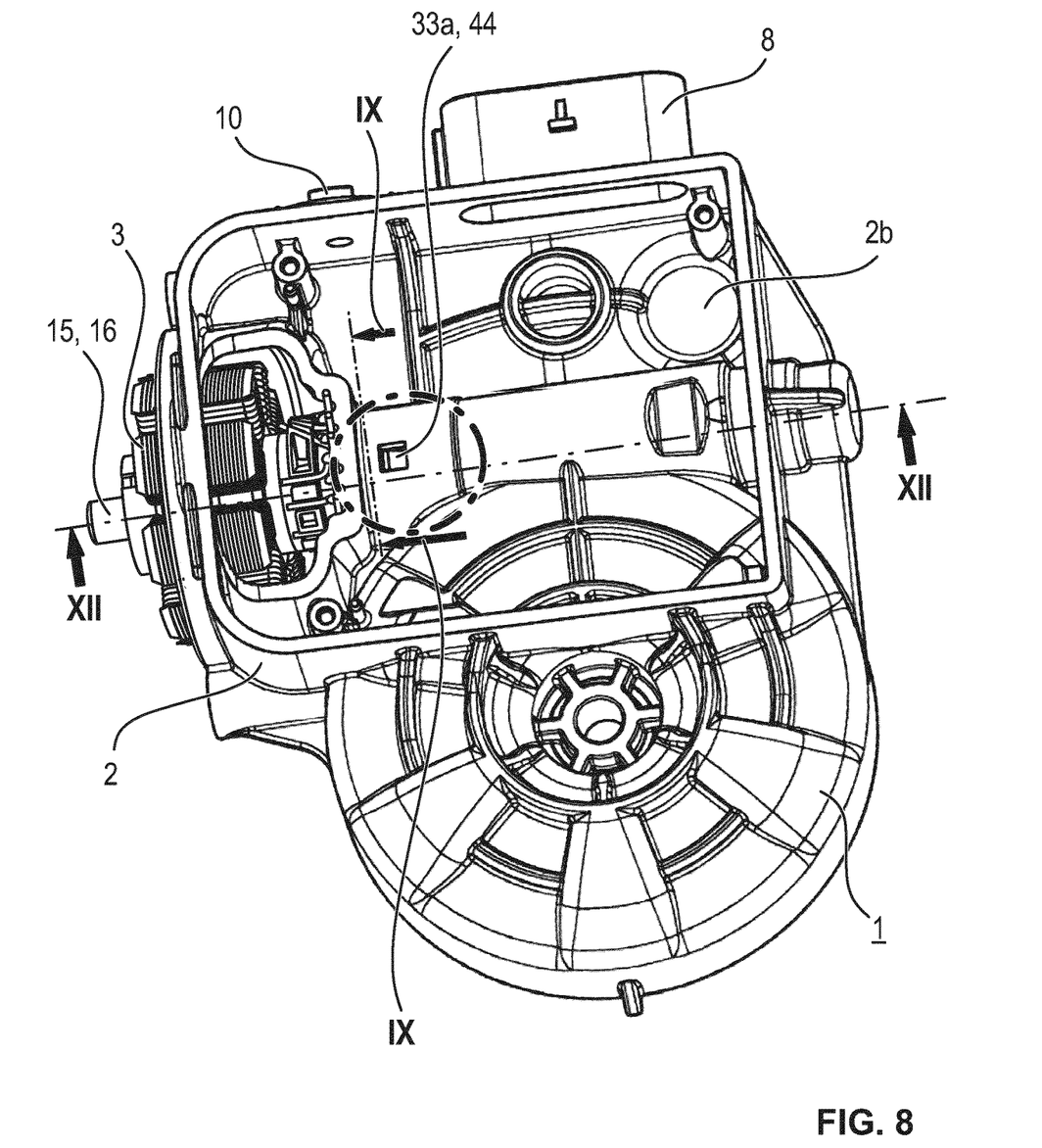
FIG. 8 in a perspective illustration according to FIG. 3 showing the drive device having an electric motor in the gearbox housing, without motor electronics, with a view into a latching clearance (opening) of a latching mechanism (clip-fit mechanism) of the annular element in the gearbox housing.

FIG. 8 in an illustration similar to FIG. 3 shows the drive device 1 with the circuit board 27 removed from the gearbox housing 2, and without motor electronics 28, having an electric motor 3 which by way of the housing or insertion opening 4 has been inserted into the gearbox housing 2, in the terminal position of the electric motor 3 with the view into a latching clearance (latching opening) 44 of a latching mechanism (clip-fitting mechanism) of the annular element 34 in the gearbox housing 2. FIG. 9 shows this assembly state in a sectional illustration taken along the line IX-IX shown in FIG. 8.

As can be comparatively clearly seen in FIGS. 9 and 12, the joining elements 33 of the annular element 34, which are disposed so as to be mutually offset by 180°, by way of the latching or clip-fitting hooks thereof (hook or clip elements) 33a thereof on the free end, are latched (clip-fitted) in accordingly corresponding, mutually opposite latching clearances (latching opening) 44.

FIG. 10 in a sectional illustration shows the opening region of an insertion opening 45 of the hollow-cylindrical housing portion 2c of the gearbox housing 2, having an introduction ramp 46, and having an oblique bearing contour 47 which is inclined radially inwardly toward the centerline M corresponding to the motor or shaft axis of the electric motor 3, or to the drive shaft of said electric motor 3, respectively, said bearing contour 47 being an extraction ramp in the axial groove as a joining contour 32 of the stator bush 31 for the respective joining element 33 of the annular element 34, for the purpose of rotationally securing said joining element 33.

The bearing contour 47 on the stator bush is sized in such a manner that the wedge-shaped hook element 33a of the respective joining element 33, and the introduction ramp 46 on the housing, are aligned so as to be mutually parallel according to the dashed lines L1 and L2 visualized in FIG. 11. As a result, it is made possible or ensured, respectively, that the stator bush 31 by way of the annular element 34 joined in the first latching or clip-fitting connection 36a can be inserted into the hollow-cylindrical housing portion 2c of the gearbox housing 2 via the insertion opening 45. For example, by virtue of a corresponding void between the joining element 33, in-particular the wedge-shaped hook element 33a thereof and the groove base of the joining contour 32, the joining element 33 on the free end, or the hook element 33a thereof, respectively, can yield radially inwardly in the direction of the central axis (shaft axis) M visualized by chain-dotted lines.

In the terminal position shown in FIG. 12, the stator 18 having the assembly thereof composed of the stator bush 31, the annular element 34, the stator main body 18a, the slot cell insulation 23 and the winding 21, is fixed in a form-fitting manner in a second latching or clip-fitting connection 36b in the gearbox housing 2 and is reliably secured in the intended radial and axial position. In the process, the respective joining element 33 on the annular element, while establishing the second latching or clip-fitting connection 36b, rebounds radially into the corresponding latching clearance 44 on the housing.

The serration 31c on the first sleeve or bush portion 31a of the stator bush 31 serves for a particularly secure mounting of the stator 18 in the gearbox housing 2. A spline toothing of the stator bush 31 conjointly with the hollow-cylindrical housing portion 2c of the gearbox housing 2 here can be established only by a form-fit or else by a form-fit and a force-fit, in that the serration 31c in the context of a pressing procedure using ideally minor press-in forces displaces ideally little wall material in the region of the hollow-cylindrical housing portion 2c.

In summary, the drive device 1 has a gearbox housing 2 having assembled therein a brushless electric motor 3 in an external rotor embodiment, which is able to be coupled or is coupled to a gearbox and is actuated by means of motor electronics 28. The electric motor 3 has a stator 18 and a rotor 20 which revolves about the latter and is connected to a drive shaft 16 that is routed through a stator bush 31 which has a first sleeve portion 31a for mounting in a rotationally fixed manner the stator bush 31 in the gearbox housing 2, and a second sleeve portion 31b onto which a slot cell insulation 23 which in the axial direction A at least partially encompasses the stator teeth 24 is placed. An annular element 34 is placed onto the second sleeve portion 31b of the stator bush 31, the annular element 34 being disposed between the first sleeve portion 31a and the slot cell insulation 23 and having at least one joining element (33) which engages in a corresponding joining contour 32 of the stator bush 31.

The claimed invention is not restricted to the exemplary embodiments described above. It is rather also possible for other variants of the invention to be derived therefrom within the scope of the disclosed claims by a person skilled in the art, without departing from the subject matter of the claimed invention. In particular, all individual features described in conjunction with the various exemplary embodiments may furthermore also be combined in some other way within the scope of the disclosed claims, without departing from the subject matter of the claimed invention.

Moreover, the solution described can be used not only in the application specifically illustrated but in a similar embodiment also be used in other automotive applications, such as, for example, in door and rear hatch systems, in window lifters, in vehicle locks, in adjustable seat and interior systems, and in electric drives, controls, sensors and the arrangement thereof in the vehicle.

The following is a summary list of reference numerals and the corresponding structure used in the above description of the invention.

LIST OF REFERENCE SIGNS

1 Drive device
2 Gearbox/drive housing
2a Housing opening
2b Interior space
2c Housing portion
3 Electric motor
4 Housing/insertion opening
5 Drive output element
6 Connector plug 7 Connecting line
8 Connector receptacle
9 Drive/shaft journal
10 Ventilation opening
11 Diaphragm
12 Connecting mandrel
13 Housing cover
14 Screw
15 Shaft journal
16 Drive/motor/rotor shaft
17 Bearing point
18 Stator
18a Stator main body
19 Permanent magnet
20 Rotor
21 Stator/rotating field/winding
23 Slot cell insulation
24 Stator tooth
25 Rotor/housing
26 Construction element
27 Circuit board
28 Motor electronics
29 Phase/coil connector
30 Connector receptacle
31 Stator bush/sleeve
31a First sleeve/bush portion
31b Second sleeve/bush portion
31c Serration
32 Joining contour/axial groove
32a Latching contour
33 Joining element
33a Hook/clip element
34 Annular element
35 Bearing opening
36a First latching/clip-fitting connection
36b Second latching/clip-fitting connection
37 Annular portion
38 Coil carriers
39 Joining/axial groove
40 Positioning/rotational locking element
41 Tooth space
42 Recess/groove
43 Guide rim
44 Latching clearance/opening
45 Insertion opening
46 Introduction ramp
47 Bearing contour
A Axial direction
M Centerline/motor/shaft axis
R Radial direction
U Circumferential direction

The invention claimed is:

1. A drive device, comprising:
motor electronics;
a gearbox housing having a hollow-cylindrical housing portion;
a brushless electric motor in an external rotor embodiment assembled in said gearbox housing, and being able to be coupled or is coupled to a gearbox and being actuated by means of said motor electronics, said brushless electric motor having a stator bush and a stator with a slot cell insulation and a plurality of stator teeth being disposed in a star-shaped manner and being wound with a stator winding, said brushless electric motor further having a drive shaft and a rotor revolving about said stator and connected to said drive shaft that is routed through said stator bush, said stator bush having a power take-off type first sleeve portion for mounting in a rotationally fixed manner said stator bush in said hollow-cylindrical housing portion of said gearbox housing and a second sleeve portion onto which said slot cell insulation that at least partially encompasses said stator teeth in an axial direction is disposed; and
an annular element, being disposed between said power take-off type first sleeve portion and said slot cell insulation, is disposed onto said second sleeve portion of said stator bush, said annular element having at least one joining element which engages in a corresponding joining contour of said power take-off type first sleeve portion of said stator bush.

2. The drive device according to claim 1, wherein said power take-off type first sleeve portion of said stator bush has a serration formed therein for connecting in a form-fitting manner or a form-fitting and force-fitting manner to said hollow-cylindrical housing portion of said gearbox housing.

3. The drive device according to claim 1, wherein:
said at least one joining element extends axially; and/or
said corresponding joining contour corresponding to said at least one joining element extends axially into said power take-off type first sleeve portion of said stator bush.

4. The drive device according to claim 1, wherein:
said gearbox housing has a latching opening formed therein; and
said at least one joining element on a free end has a hook or clip element which engages in said latching opening of said hollow-cylindrical housing portion of said gearbox housing.

5. The drive device according to claim 1, wherein said corresponding joining contour of said power take-off type first sleeve portion of said stator bush is a radially raised latching contour which, in a joined state of said stator bush, in said hollow-cylindrical housing portion of said gearbox housing is engaged behind by said at least one joining element on said annular element.

6. The drive device according to claim 5, wherein said radially raised latching contour has an oblique bearing contour for said at least one joining element on said annular element.

7. The drive device according to claim 1, wherein:
said hollow-cylindrical housing portion has an insertion opening formed therein; and
said hollow-cylindrical housing portion of said gearbox housing in a region of said insertion opening for said stator bush has an introduction ramp for said at least one joining element on said annular element.

8. The drive device according to claim 1, wherein said slot cell insulation has a first and a second slot cell insulation part that have an annular portion which in a region of said second sleeve portion of said stator bush encompass said annular portion and on which a number of semi-shell-shaped, radially extending coil carriers are integrally molded, said number corresponding to a number of said stator teeth.

9. The drive device according to claim 1, wherein:
said annular element is integrally molded on said slot cell insulation; or
said slot cell insulation has a joining groove formed therein, said annular element on an end side that faces said slot cell insulation has a positioning and/or rotational locking element which engages in said joining groove of said slot cell insulation.

10. The drive device according to claim 1, wherein said annular element has a guide rim having a number of axially running receptacle grooves formed therein and/or a number of further receptacle grooves formed therein which at an angle between 20° and 70°, run obliquely in relation to a central axis for receiving winding portions, coil or phase connectors of said stator winding.

11. The drive device according to claim 1, wherein:
the drive device is an electric-motor window lifter drive of a motor vehicle; and
said at least one joining element is one of two joining elements disposed so as to be offset by 180°.

12. The drive device according to claim 8, wherein said annular element is integrally molded on one of said first or second slot cell insulation parts.

13. The drive device according to claim 1, wherein said annular element has a guide rim having a number of axially running receptacle grooves formed therein and/or a number of further receptacle grooves formed therein which at an angle between 30° and 60°, run obliquely in relation to a central axis for receiving winding portions, coil or phase connectors of said stator winding.

14. The drive device according to claim 1, wherein said annular element has a guide rim having a number of axially running receptacle grooves formed therein and/or a number of further receptacle grooves formed therein which at an angle between 40° and 50°, run obliquely in relation to a central axis for receiving winding portions, coil or phase connectors of said stator winding.

15. The drive device according to claim 1, wherein said annular element has a guide rim having a number of axially running receptacle grooves formed therein and/or a number of further receptacle grooves formed therein which at an angle between 45° and 50°, run obliquely in relation to a central axis for receiving winding portions, coil or phase connectors of said stator winding.

* * * * *